S. DIPLOCK.
THERMOMETERS FOR STEAM APPARATUS.
No. 176,778. Patented May 2, 1876.
Fig: 2. 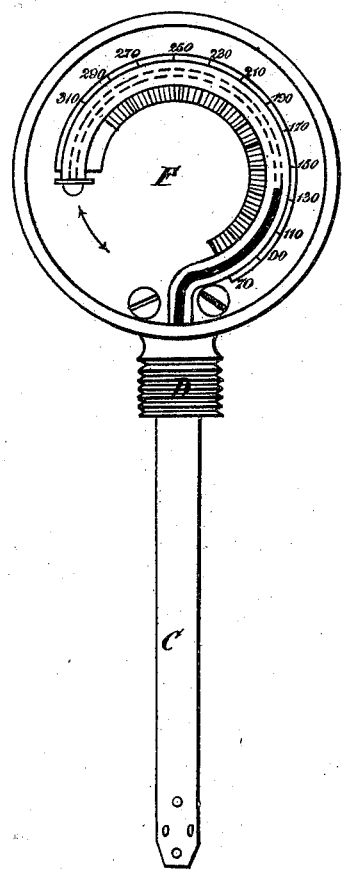 Fig: 3.  Fig: 4. 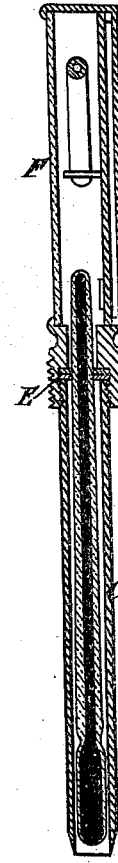 Fig: 1. 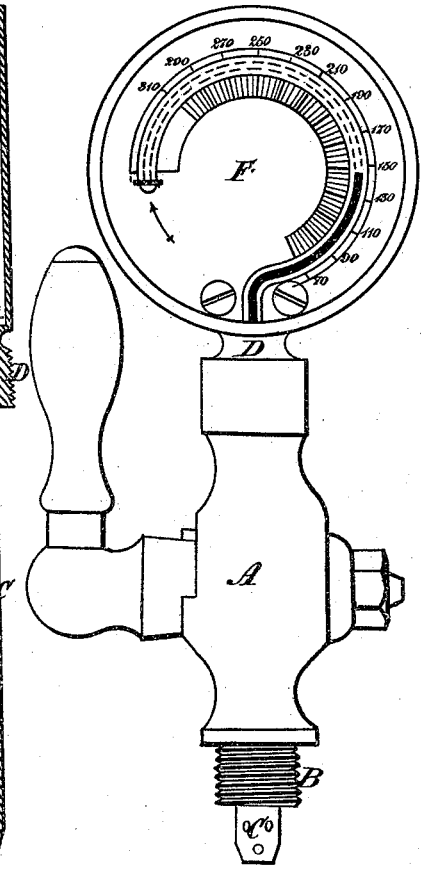
WITNESSES
F. Sith
Wm A. Skinkle
INVENTOR
Samuel Diplock
By his Attorney
Wm D. Baldwin

UNITED STATES PATENT OFFICE

SAMUEL DIPLOCK, OF 92 REGINA ROAD, TOLLINGTON PARK, ENGLAND.

IMPROVEMENT IN THERMOMETERS FOR STEAM APPARATUS.

Specification forming part of Letters Patent No. 176,778, dated May 2, 1876; application filed April 8, 1876.

*To all whom it may concern:*

Be it known that I, SAMUEL DIPLOCK, of 92 Regina Road, Tollington Park, in the county of Middlesex, England, have invented new and useful Improvements in Apparatus for Ascertaining the Temperature of Fluids Contained in Pipes, Boilers, or other Closed Vessels, which improvement is fully set forth in the following specification:

This invention has for its object improvements in apparatus for ascertaining the temperature of fluids contained in pipes, boilers, or other closed vessels.

For this purpose I fix on the top or other part of the vessel a tap or cock terminating in a screw-socket. The water-way through the tap or cock I make cylindrical. I fit it so as to enter freely a metal tube provided with a collar having a screw upon it corresponding with that within the socket. Into this tube the lower part of a thermometer is inserted. The thermometer passes through the tube from end to end, and a packing is applied so that the tube is completely closed.

The tap or cock, of the special construction above described, remains permanently fixed upon the boiler, pipe, or other apparatus; but the thermometer and the tube into which it is fitted is only applied when the temperature is to be observed. Then, when the tap or cock is still closed, the tube attached to the thermometer is inserted into the water-way of the tap or cock, which it fits, and, consequently, closes, so that the tap or cock may now be opened without admitting of any escape of the water or fluid, even though it be under pressure. The tube is then pressed home until the bulb of the thermometer is in the midst of the fluid of which the temperature is to be tested.

The screw-collar on the tube is then made to enter the corresponding socket on the tap or cock, and so the thermometer becomes fixed in its place, where it is allowed to remain until the observation is complete.

The drawings hereunto annexed show an apparatus constructed as above described.

Figure 1 shows an elevation of the apparatus; Fig. 2, a front elevation of the thermometer with its outer protecting-tube; Fig. 3, a side elevation; and Fig. 4, a vertical cross-section of the same.

A is the tap, which is to be fitted onto the pipe or boiler or other closed vessel; B, a screw-socket on the outlet of the tap; C, a cylindrical metal tube, fitting the water-way of the shell of the tap and the cylindrical hole which is formed through its plug. Within this tube is contained the bulb and lower part of the thermometer. The tube at its upper end screws into a collar, D, carrying the gage index or face. For convenience this is made circular, and the upper end of the tube of the thermometer is bent to the arc of a circle, as shown.

Packing is inserted at E so as completely to close the upper end of the tube C. F is a glass face to protect the upper end of the thermometer-tube and the dial from injury.

A screw-thread is cut upon the exterior of the collar D, so that it may be screwed into the screw-socket on the outlet of the tap, as shown at Fig. 1.

Having thus described the nature of my invention, and the manner of performing the same, I would have it understood that I claim—

1. The combination of the cock or tap, adapted to be secured to a pipe, boiler, or other closed vessel, the tube fitting water-tight in the way through the shell of said cock or tap, and passing through the hole of its plug, the thermometer having its bulb and lower part inserted in said tube, and packing around the thermometer, these members being constructed and operating substantially as hereinbefore set forth, whereby the thermometer may be applied to and detached from the cock, and the bulb be immersed in the fluid, the temperature of which is to be tested.

2. The combination of the gage-index, its collar threaded both externally and internally, the thermometer, the tube screwing into the gage-collar, and containing the bulb and lower portion of the thermometer, and the packing around the thermometer inside the gage-collar, substantially as and for the purpose set forth.

3. The combination, substantially as hereinbefore set forth, of the tap or cock, having its ends threaded, one internally and the other externally, the gage-index, the externally-threaded collar thereof, the tube secured at its upper end to the inside of said collar, and the thermometer having its lower end and bulb inserted in said tube, for the purposes specified.

S. DIPLOCK.

Witnesses:
G. F. WARREN,
WILMER M. HARRIS.
*Both of No. 17 Gracechurch street, London.*